Patented Jan. 2, 1923.

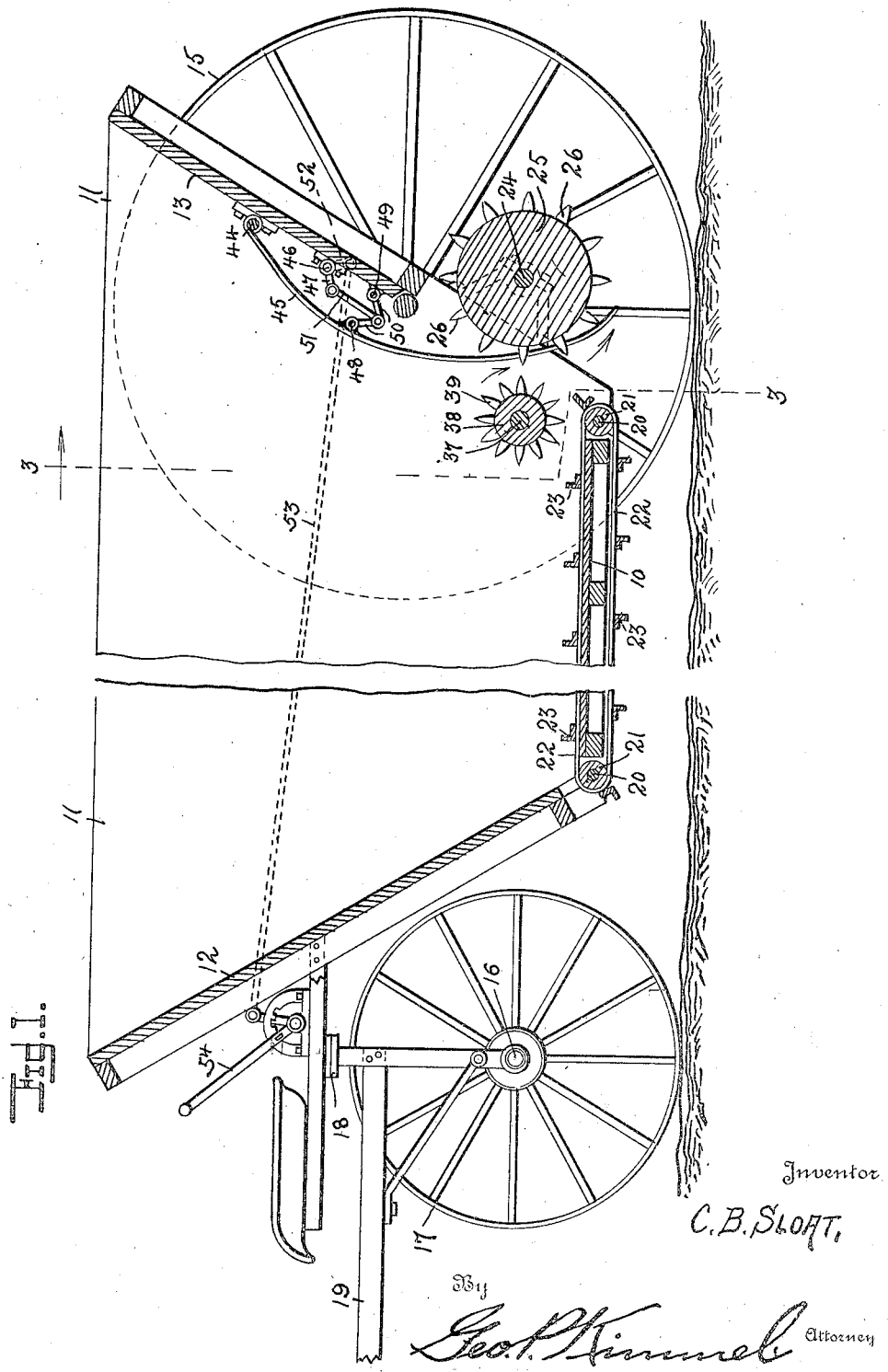

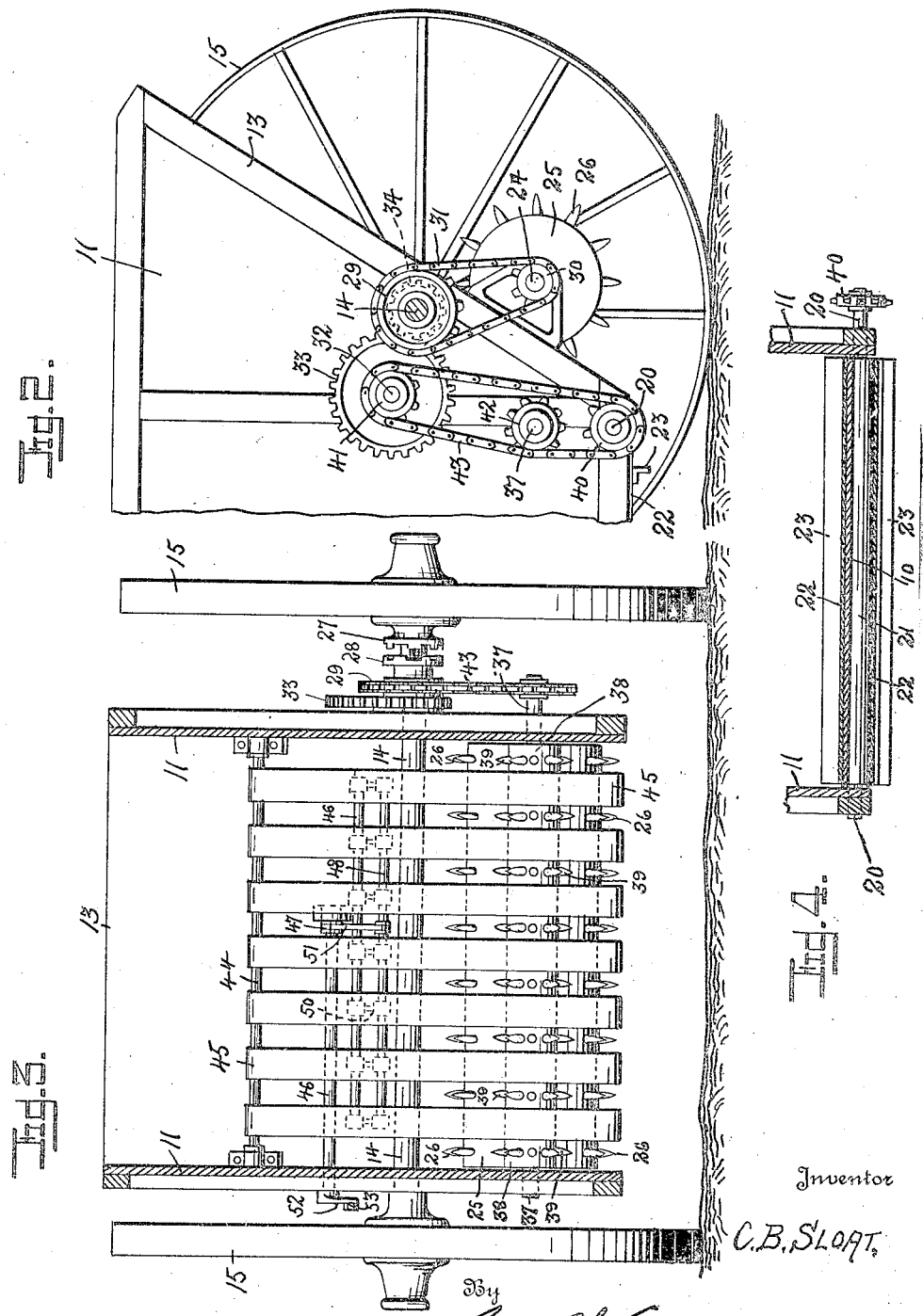

1,441,128

UNITED STATES PATENT OFFICE.

CHARLES B. SLOAT, OF GETTYSBURG, SOUTH DAKOTA.

STRAW SPREADER.

Application filed March 26, 1921. Serial No. 455,885.

*To all whom it may concern:*

Be it known that I, CHARLES BENJAMIN SLOAT, a citizen of the United States, residing at Gettysburg, in the county of Potter and State of South Dakota, have invented certain new and useful Improvements in a Straw Spreader, of which the following is a specification.

This invention relates to apparatus for uniformly distributing straw and like products over the ground prior to the plowing operation, and has for one of its objects to simplify and improve the construction and increase the utility and efficiency of devices of this character.

Another object of the invention is to provide an apparatus of this character in which the straw or like material is thrown downwardly upon the ground and thus protected from the action of the wind.

Another object of the invention is to provide an apparatus of this character having means for adjusting the discharging mechanism to adapt the "feed" to the condition or size of material.

With these and other objects in view, the invention consists in certain novel features of construction as hereinafter shown and described and then specifically pointed out in the claims, and in the drawings illustrative of the preferred embodiment of the invention, Figure 1 is a longitudinal sectional elevation.

Fig. 2 is a side elevation of the rear portion of the apparatus.

Fig. 3 is a transverse section on the line 3—3 of Fig. 1, looking in the direction of the arrow, and Fig. 4 is a detail sectional view illustrating the construction of the slatted carrier belt.

The improved apparatus includes a relatively large receptacle for the product to be distributed, for instance straw from a threshing machine, mounted upon carrier wheels. The vehicle is adapted to having draft animals attached thereto to draw it over the field, or any other suitable motive power may be employed for this purpose. The receptacle is represented as comprising a bottom member 10, side members 11 and end members 12 and 13, the latter preferably inclined as shown.

The rear axle is represented at 14, the rear carrier wheels at 15, the forward axle at 16 and the forward carrier wheels at 17. The forward axle is provided with the usual swivel device such as a fifth wheel 18 to enable the apparatus to be steered, and is likewise provided with a draft appliance, represented conventionally at 19.

At its ends the floor 10 is formed with openings, and mounted for rotation within the openings are shafts 20 each carrying a drum 21, to receive an endless belt 22.

The belt 22 is provided at uniformly spaced intervals with carrier bars or slats 23, preferably of L bars as shown.

By this means an effectual carrier device is produced whereby the straw or other material will be fed toward the rear end of the receptacle when the drums are actuated.

The rear end 13 of the receptacle is formed with a relatively large opening at its lower part, and mounted opposite to this larger opening is a shaft 24 carrying a drum 25, the latter having a plurality of radial spikes or teeth 26. One of the rear wheels 15 is provided with a clutch member 27 and the axle 14 is provided with an opposing clutch member 28 slidable on the axle and caused to rotate therewith, for instance by the well-known coacting keyway and key.

A chain wheel 29 is mounted on the axle 14 and rotates therewith, while a chain pinion 30 is carried by the shaft 24, and endless chain 31 leading over the wheel 29 and pinion 30. By this means the rear carrier wheel 15 to which the clutch member 27 is attached, may be coupled to or uncoupled from the rear axle by merely actuating a shipper rod not shown, as will be obvious. The clutch carrying rear wheel 15 may thus be utilized to transmit motion to the toothed drum 25 in the direction of the arrow, or disconnected therefrom when required.

The clutch device the chain wheels 29 and 30 and the chain 31 are all arranged externally of the receptacle, as shown.

Attached to one of the side walls 11 of the receptacle is a stub shaft 32, and mounted on the stub shaft is a gear wheel 33 which engages with a pinion 34 on the axle 14.

Mounted for rotation through the side walls 11 of the receptacle is another shaft 37 carrying a drum 38 having radial teeth 39, the drum and teeth serving as a "beater" in coaction with main drum 25 and its teeth 26.

The shafts 20, 32 and 37 are provided with chain pinions 40, 41 and 42 over which an endless chain 43 operates, the shaft 37 being out of alignment with the shafts 20 and 32, so that the chain 43 will engage the pinion 41 on one side only, as shown. By this means the toothed drum 38 and the shaft 20 carrying the slatted belt, will be driven from the shaft 24.

Mounted to swing at 44 from the inner face of the rear wall 13 of the receptacle is a combined guard and controlling device comprising a plurality of slats or arms 45 uniformly spaced and curving from end to end and extending downwardly between the drums 25 and 38, the arms being so spaced as to avoid the teeth 26 and 39 of the drums.

Mounted for oscillation upon the inner face of the member 13 of the receptacle is a shaft 46 carrying a lever arm 47, and extending over the rear of the arms 45 and pivoted to each, is a rod 48. Mounted for oscillation upon the rear wall 13 of the receptacle is another shaft 49 and pivoted respectively to each other and to the shafts 48 and 49 are toggle links 50, one set of the links being coupled by a rod 51 to the arm 47 of the shaft 26. Attached to the shaft 46 externally of the receptacle is an arm 52 from which an operating rod 53 leads. At its forward end the rod 53 is coupled to an operating lever 54, located convenient to the driver on the seat of the vehicle, as shown.

By this arrangement, the guard devices 45 may be adjusted to control the distance which the teeth 26 project in advance of the bars, and thus adapt the device to straw or the like of different lengths, and likewise to adapt the device to straw and the like of different conditions. For instance when the straw which has been deposited in the receptacle is relatively long, tough, and unbroken, the guards will be adjusted to cause the teeth 26 to project a relatively short distance, in advance of the guards, and when the straw is short and brittle, the guards will be adjusted to cause the teeth to project for a great distance.

Thus the speed of the "feed" may be easily controlled by merely adjusting the location of the guard with reference to the toothed drums.

It is easier for the teeth 39 of the beater drum 38 to engage long tough straw when the guard is adjusted to hold the straw relatively near the beater drum, hence the necessity for adjusting the guards as above noted.

As the vehicle is moved over the field the "apron" or slatted belt 22 and the toothed drums are rotated by the action of the rear wheel 15 with which the clutch is associated, and the contents of the receptacle fed to the discharging mechanism. The material is caught and picked up from the carrier device by the teeth of the beater drum and fed thereover and to the teeth of the main drum and thus rapidly fed downwardly upon the ground beneath the rear axle, and is thus prevented from coming in contact with the wind and driven thereby over the field.

It will be noted that the floor 10 and apron 22—23 travel relatively close to the ground, hence the drums 25 and 38 also travel close to the ground and the latter arranged in position to feed the straw downwardly upon the ground. It will be noted that the discharging drum 25 travels at a higher speed than the feeder drum 38.

The apparatus is simple in construction, can be inexpensively manufactured, and operates effectually for the purposes described.

The preferred embodiment of the invention is disclosed in the drawings and set forth in the specifications, but it will be understood that any modifications within the scope of the claims may be made in the construction without departing from the principle of the invention or sacrificing any of its advantages.

What is claimed is:—

1. In an apparatus of the class described, a carrier for the material, a drum having radiating teeth and spaced from the discharge end of the carrier, means for rotating said drum to cause its teeth to move downwardly toward the carrier, at the side next to the same, a toothed picker and feeder drum rotating relatively close to the drum and to the carrier at its discharge end and picking the material therefrom and feeding it to the downwardly moving teeth of the drum, a plurality of slats extending between the drum and the combined picker and feeder and between which the teeth of the drum extend, and means for adjusting the slats to control the distance which the teeth of the drum extend in advance of the slats.

2. An apparatus of the class described comprising a receptacle having an opening at one end, a carrier device having its discharge at the lower end of said opening, a toothed material discharging drum mounted for rotation and extending into the opening, said drum being spaced from the discharge end of the carrier with the teeth next to the same movable downwardly, a combined picker and feeder drum rotating relatively close to the carrier at its discharge end to pick the material therefrom and feed it to the downwardly moving teeth of the drum, a plurality of slats swingingly connected at one end to the receptacle and extending between the first mentioned drum and the combined picker and feeder and between which the teeth of the first mentioned drum extend, and means for adjusting the slats to control the distance which the teeth of said drum extend in advance of the slats.

In testimony whereof, I affix my signature hereto.

C. B. SLOAT.